Dec. 4, 1951   H. W. TAYLOR   2,577,594
COATING MACHINE CONVEYER
Filed Nov. 24, 1947   6 Sheets-Sheet 1

INVENTOR.
HOWARD W. TAYLOR
BY
*John F. Hanrahan*
ATTORNEY

Dec. 4, 1951  H. W. TAYLOR  2,577,594
COATING MACHINE CONVEYER
Filed Nov. 24, 1947  6 Sheets-Sheet 2

INVENTOR.
HOWARD W. TAYLOR
BY
John F. Hanrahan
ATTORNEY

Fig. 4

Dec. 4, 1951          H. W. TAYLOR          2,577,594

COATING MACHINE CONVEYER

Filed Nov. 24, 1947          6 Sheets-Sheet 3

INVENTOR.
Howard W. Taylor
BY
ATTORNEY

INVENTOR.
HOWARD W. TAYLOR
BY
ATTORNEY

Dec. 4, 1951    H. W. TAYLOR    2,577,594
COATING MACHINE CONVEYER
Filed Nov. 24, 1947    6 Sheets-Sheet 5
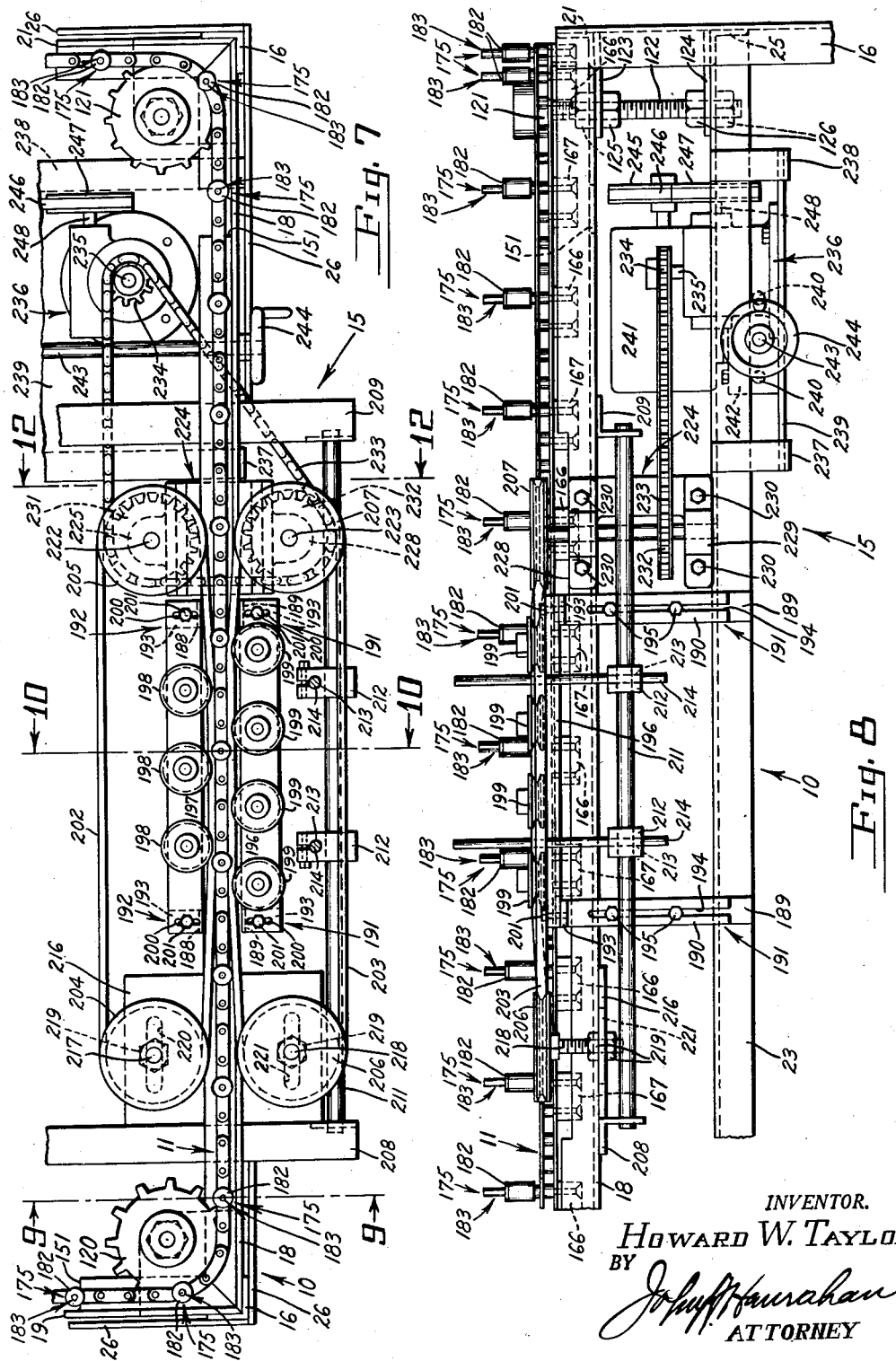
INVENTOR.
HOWARD W. TAYLOR
BY
ATTORNEY Dec. 4, 1951 H. W. TAYLOR 2,577,594
COATING MACHINE CONVEYER
Filed Nov. 24, 1947 6 Sheets-Sheet 6
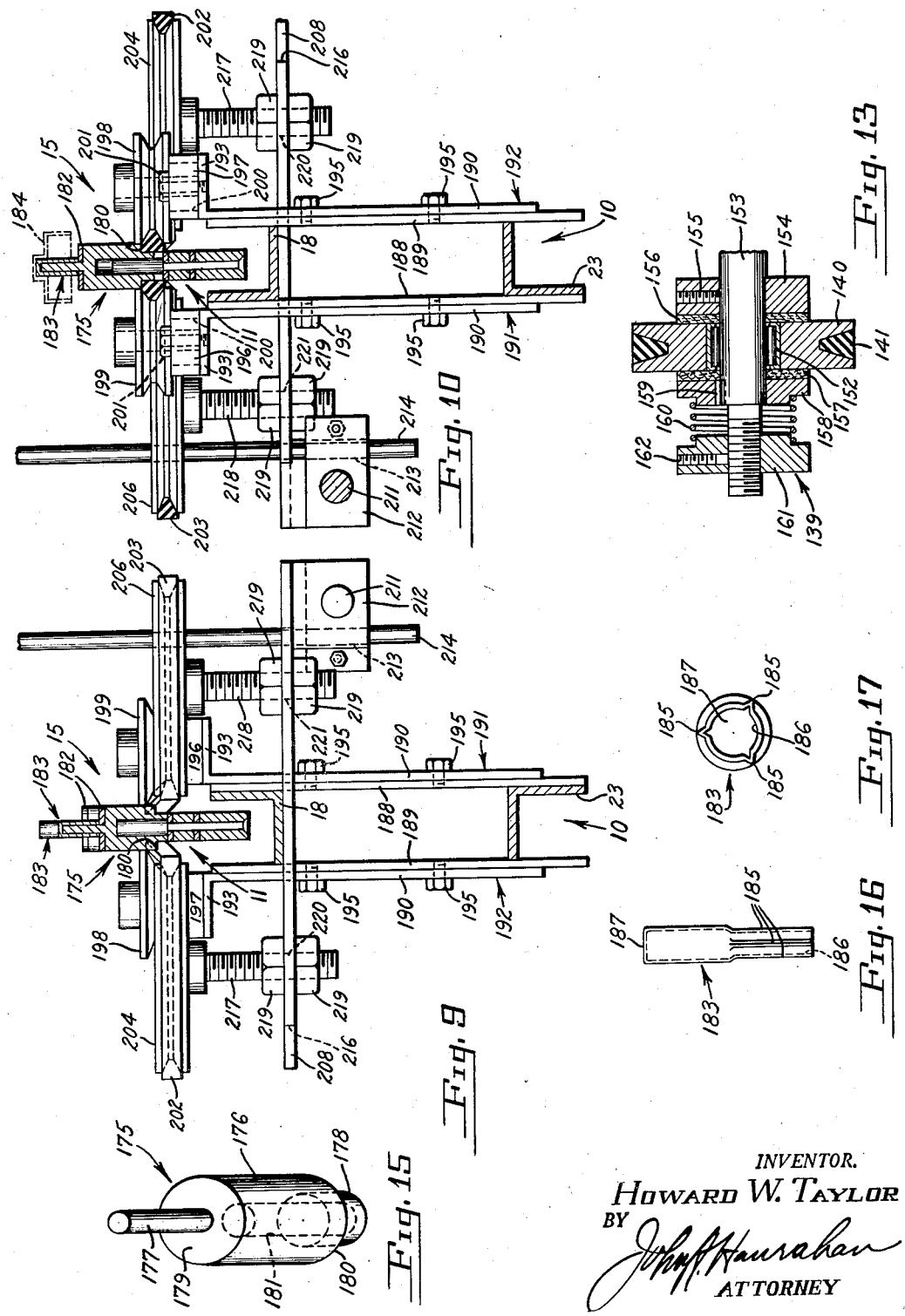
INVENTOR.
HOWARD W. TAYLOR
BY
ATTORNEY Patented Dec. 4, 1951

2,577,594

UNITED STATES PATENT OFFICE 2,577,594

COATING MACHINE CONVEYER

Howard W. Taylor, Danbury, Conn.

Application November 24, 1947, Serial No. 787,693

8 Claims. (Cl. 198—19)

This invention relates to new and useful improvements in apparatus for coating articles and has particular relation to a spray-bake continuous conveyor machine for use in spraying a coating material onto articles and for thereafter baking or curing such coating material onto the articles.

An object of the invention is to provide a high speed continuously operating machine including a conveyor means exposed in part to have articles placed thereon and removed therefrom, a spraying compartment through which the conveyor carries the articles and in which the articles are fully coated, and a baking or curing compartment through which the articles are carried for the baking or curing of the coat thereon.

Another object is to provide a machine of the character described and which is of simple and rugged construction including features to prevent jamming of the machine and features insuring coating of all parts of the articles presented to the machine and including features insuring thorough baking or curing of the coating material on the articles.

The machine of the invention is designed for a high rate of production of coated articles and includes means guarding against waste or excessive use of heat in the baking or curing of the coating onto the articles.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 4 is a top plan view of the lower portion of the machine with the upper casing structure removed to better show the operating parts;

Fig. 7 is an enlarged plan view of the conveyor structure and of the article rotating structure of the sprayer compartment of the machine;

Fig. 8 is an elevational view looking from the lower side of Fig. 7;

Fig. 9 is an enlarged detail sectional view taken as along the line 9—9 of Fig. 7;

Fig. 10 is a similar view taken as along the line 10—10 of Fig. 7;

Fig. 15 is an isometric view of a work mounting spindle;

Fig. 16 is a side elevational view of a masking device;

Fig. 17 is an enlarged view looking from the lower open end of the device of Fig. 16; and Fig. 18 is a view similar to Fig. 14 but showing a slight modification.

Figure 1:
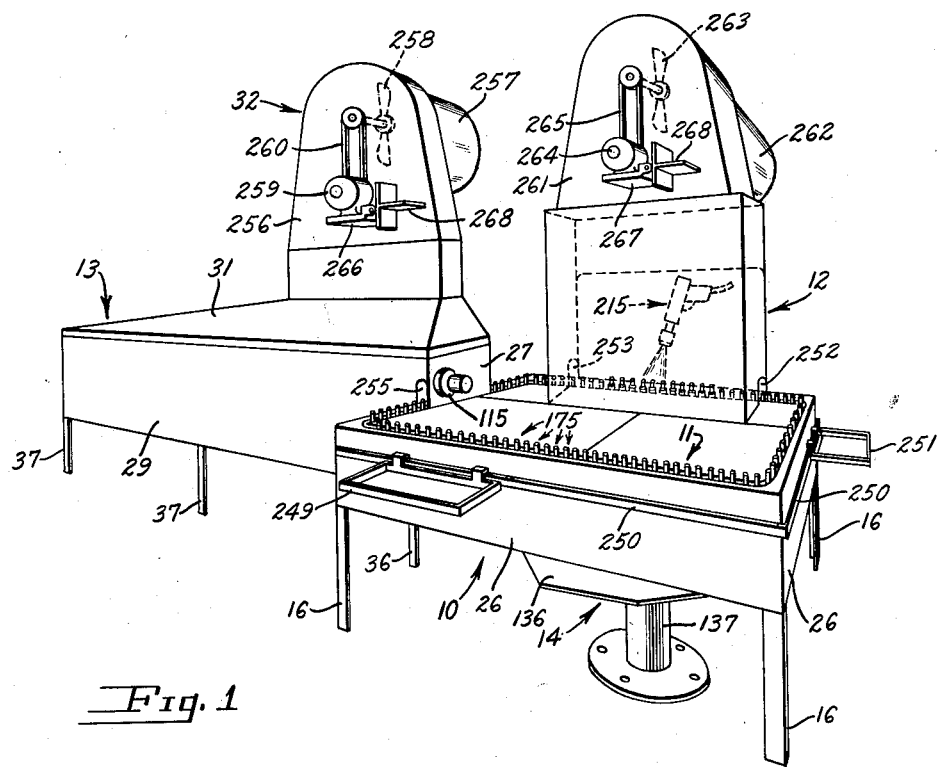
Fig. 1 is an isometric view showing the complete machine of the invention.

Referring in detail to the drawings, the machine of the invention, while including considerable detail, is made of but two general parts comprising a structure or part, generally designated 10, supporting a conveyor generally designated 11 and a spraying or coating chamber or compartment 12. Beyond one end of structure or part 10 is a coat curing and baking oven generally designated 13. Mechanism for driving the conveyor 11 is mounted within the structure 10 and is generally designated 14 (Fig. 4) while means for rotating the work within the spraying or coating compartment 12 is associated with and mounted on the structure 10 and is generally designated 15 (Fig. 4).

Structure 10 includes a generally rectangular frame supported at the desired height as on legs 16 and said frame comprises upper horizontally aligned angle iron members 17 and 18 at the front and back, respectively, of the machine, an end angle iron 19 connecting the right hand ends of members 17 and 18 and opposite end sections 20 and 21 connected at their outer ends with the ends of front and rear top angle iron frame members 17 and 18, respectively.

Parallel with but below the members or angle iron sections 17, 18, 19 and 20 and 21 are similar members or sections 22, 23, 24 and 25, respectively, the section 25 being one piece located below and extending under both the upper sections 20 and 21. The members or sections of angle iron of the upper frame portion are welded or otherwise rigidly connected at their adjacent ends, the welds being on miter joints and at the corners thus established the frame is welded or otherwise secured to the corner legs 16, also of angle iron. The lower frame section is similarly formed of the lengths or sections 22, 23, 24 and 25 and such lower frame at its corners is welded or otherwise anchored to the corner legs 16 and may also have the adjacent ends of its sections welded together.

The angle irons of each of the upper and lower frame sections are arranged to provide horizontal and vertical flanges but the vertical flanges of the upper frame section extend upwardly (Fig. 11) while those of the lower frame section extend downwardly. Further, the members 20 and 21 of the upper frame section stop short of one another at their inner ends and such ends are connected with the frame sections of the oven 13 as will be described. About the section 10 and particularly about the frames or frame structures described is a skirt portion 26 comprising sheet metal suitably secured to the frame sections or to the legs 16 and stopping considerably short of the lower ends of said legs as is clear from even casual inspection of Fig. 1.

The oven and curing chamber 13 is also generally rectangular and comprises a rear wall 27 located within the frame 10, side walls 28 and 29 and a front wall 30. Additionally, the oven and curing chamber is closed on its top side by a cover structure 31 which may mount an exhaust structure 32 (Fig. 1) later to be described. The upper and lower horizontal frames of structure or part 10 are continued in the oven or curing chamber 13 or horizontal frames of similar construction in said oven or curing chamber are connected with the respective horizontal frames of structure 10.

Thus, within the oven or curing chamber 13 we have an upper frame comprising opposite side angle iron members 33 and 34 welded or otherwise secured at their rear ends to the inner ends of sections 21 and 20 and a front member 35 welded or otherwise secured at its ends to the front ends of members 33 and 34. Legs 36 of angle iron, and corresponding in length to the legs 16 first described, are welded to the irons or sections 21 and 33 and 20 and 34 at their places of connection and similar legs 37 are welded to the sections 33 and 35 and 34 and 35 at their junctures.

Below but in substantially parallel relation with the described upper frame of the oven or curing chamber is a lower frame comprising sections or angle iron lengths 38, 39 and 40, respectively, corresponding to and welded in place as are the members or angle iron lengths 33, 34 and 35 of the upper frame pieces of the oven or curing chamber and also at their junctures welded or otherwise secured to the legs 36 and 37.

Cover 31 is shown (Figs. 2, 3 and 6) resting on the upper edges of the side walls of the oven and curing chamber and it may be in part supported by angle pieces 41 secured to such side walls. The side walls 28 and 29 may be welded or otherwise mounted on or secured to the legs 36 and 37 and the front wall 35 may be similarly secured or mounted on the opposed flanges or sides of the legs 37. It is noted that the various horizontal angle iron members and especially the members 33, 34, 38 and 39 have their horizontal parallel flanges directed inwardly from said side walls 28 and 29.

A pair of webs 42 and 43 are secured to the upper and lower frame members 35 and 40 and are located at the forward sides of said members between the latter and the front wall 30 of the oven or curing chamber. These webs each span the two mentioned frame members and are welded or otherwise secured to them and serve to brace the forward frame structure and have a further purpose as will appear.

The described frame of the baking or curing oven is transversely braced at a pair of spaced points as by forwardly located transversely extending upper and lower angle iron sections or members 44 and 45 (Fig. 2) welded or otherwise anchored at their ends to the upper frame members 33 and 34 and the lower frame members 38 and 39, respectively. Rearwardly or inwardly of the members 44 and 45 are similar members 46 and 47 (Figs. 3 and 6) welded or otherwise secured at their respective ends to the upper and lower members or irons 33 and 34 and 38 and 39 of the upper and lower frames, respectively, of the curing or baking oven.

Figures 2, 3:
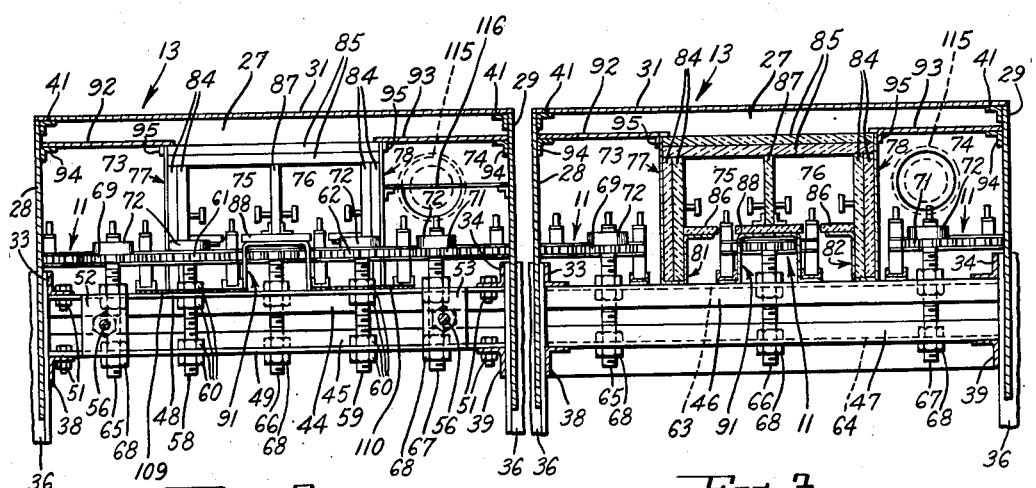
Fig. 2 is a vertical transverse sectional view taken as along the line 2—2 of Fig. 4.
Fig. 3 is a similar view taken as along the plane of the line 3—3 of Fig. 4.
Figure 5:
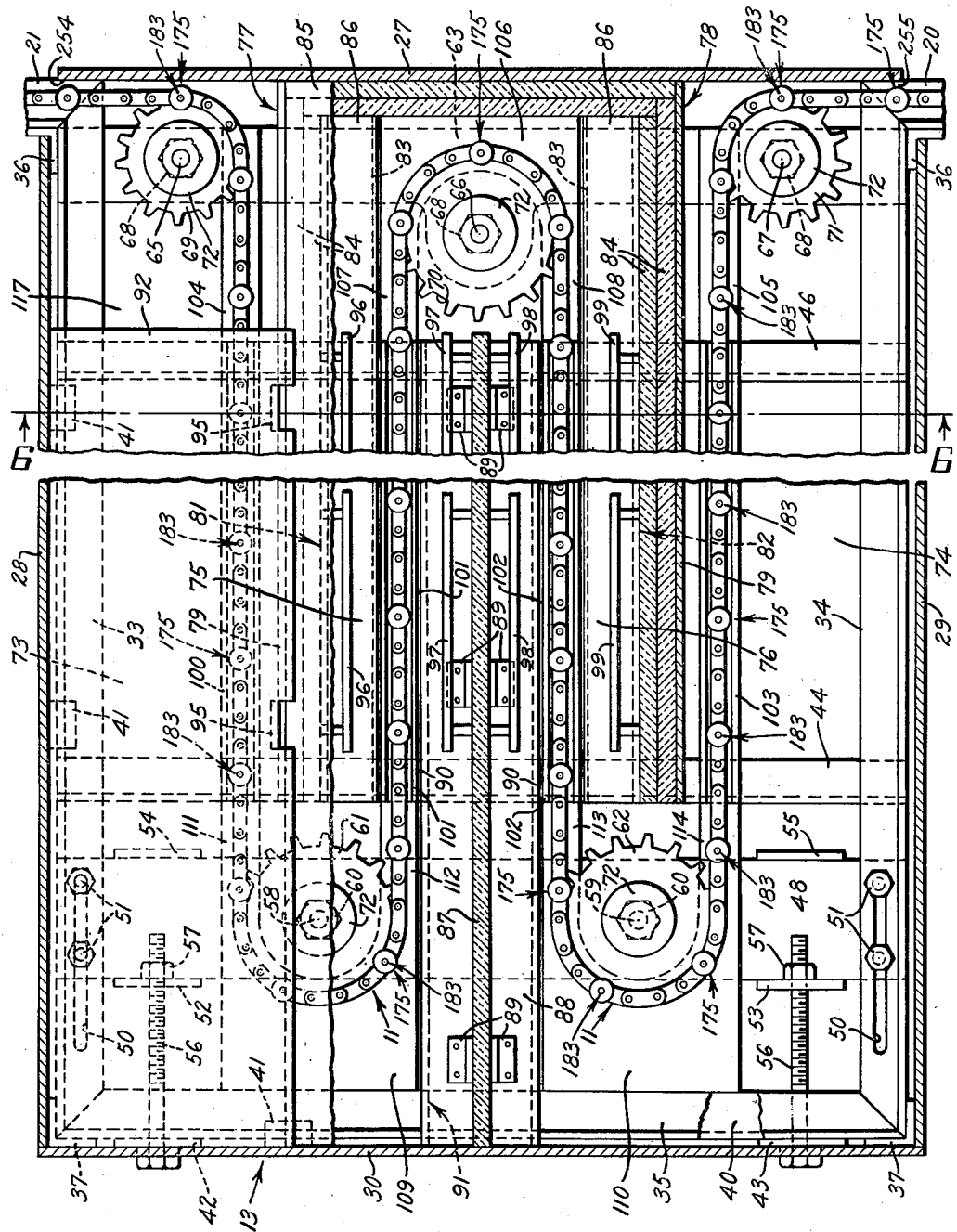
Fig. 5 is a horizontal sectional view on a larger scale, the view being taken as along the line 5—5 of Fig. 6.

In the forward portion of the oven and curing chamber, an upper plate 48 is secured to the horizontal flanges of the angle iron members 33 and 34 and a parallel lower plate 49 is secured to the horizontal flanges of the angle iron members 38 and 39 (Figs. 1 and 2). Toward their forward ends the horizontal flanges of angle iron members 33 and 34 and 38 and 39 are provided with longitudinally extending slots 50 and bolt and nut structures 51 passing through said slots and the plates 48 and 49 provide for adjustments of the plates longitudinally of the angle iron members and for the securing of the plates in adjusted positions.

Webs 52 and 53 are secured to vertically aligned, horizontally spaced portions of the upper and lower plates 48 and 49. The webs may be secured to the plates as by welding or the like to the forward edges of the plates and these webs are in line with the webs 42 and 43 above described as secured to the forward angle iron frame members 35 and 40. Additionally, other webs 54 and 55 extend across the rear edges of said plates 48 and 49 and are welded or otherwise secured to them. Webs 54 and 55 may be integral with the webs 52 and 53, respectively, if desired. In any event, all of the webs 42, 52 and 54 are in line with one another and the same is true of the webs 43, 53 and 55. The webs 52, and 54 and 53 and 55 together with the upper and lower plates 48 and 49 form a rigid unit or box-like structure.

Relatively long feed screws or bolts 56 have their shanks passing through the front wall 30 of the oven and curing chamber and are rotatably mounted in the webs 42 and 43. These bolts also pass through the webs 52 and 53 and each bolt is provided with a nut 57 rigid with and at the inner side of the chamber, it will be clear that on loosening of the nut and bolt structures 51 the bolts 56 may be rotated to shift the plates 48 and 49 with the webs 52 and 53 as a unit toward and away from the wall 30, depending on the direction of rotation of the bolts 56.

After any desired adjustment of the box-like unit comprising the plates 48 and 49 and the webs 52, 53, 54 and 55 has been made, the bolt and nut structures 51 are again tightened. Clearly, adjustment of the described box-like unit is limited by the ends of the slots 50. Extending vertically through the plates 48 and 49 are a pair of threaded shafts or bolts 58 and 59 clamped to the plates by pairs of nuts 60 and extending above the upper plate and in spaced relation to the latter mounting sprocket wheels 61 and 62, respectively.

In the rear of the curing and baking chamber 13 are another pair of upper and lower horizontal plates 63 and 64 rigidly fixed to the horizontal flanges of angle members 33 and 34 and 38 and 39, respectively. Extending vertically through these plates are three threaded shafts 65, 66 and 67 held in place by being clamped to the plates by pairs of nuts 68. The threaded shafts 65, 66 and 67 extend above the uppermost plate and in the same horizontal plane thereabove serve to support sprocket wheels 69, 70 and 71. It will be understood that the threaded shaft structures with the clamping nuts provide for adjustment of all of the shafts 58, 59, 65, 66 and 67 so that all of the sprocket wheels 61, 62, 69, 70 and 71 are located in the same horizontal plane.

On the upper sides of the sprockets is a head-like device or hub 72 retaining the sprocket wheels in place. As the description proceeds it will become evident that the endless chain conveyor 11 extends about the various sprocket wheels 61, 62, 69, 70 and 71 and it will be clear that on adjustment of the front plates 48 and 49 by manipulation of the screws 56, the front sprockets 61 and 62 will be shifted to tighten the chain conveyor and take up any slack therein or to loosen the chain for removal from the sprockets, etc.

Internally the oven structure 13 is divided into longitudinally extending compartments comprising an elongated pre-heating compartment 73, a similar cooling compartment 74 and a pair of parallel baking, drying and curing compartments 75 and 76 located between the compartments 73 and 74. The compartments 75 and 76 are well insulated and for that purpose they are defined by heat insulating material of the desired type. Referring particularly to Figs. 2, 3, 5 and 6, similar L-shaped metal pieces 77 and 78 are provided and each includes an outer vertical wall 79 and a foot portion 80. These foot portions rest on the forward and rear upper braces 44 and 46 and the upper plate 63. Inverted L-shaped pieces 81 and 82 also rest on the same braces and plate, and have their foot portions 83 horizontally disposed to provide shelf-like portions.

Sheets of insulating material 84 are received between the members 77 and 81 and 78 and 82 and other sheets 85 of insulating material are disposed on the upper edges of the sheets 84. Additional insulating strips 86 are disposed on and secured to the shelf-like portions 83. An insulating sheet 87 separates the compartments 75 and 76 and extends between the inner insulating sheet 85 and an insulating sheet 88 and is held in place by brackets 89 on the sheet 88.

The insulating sheet 88 is in horizontal alignment with the strips 86 and is slightly spaced from them although arranged between them whereby to leave slot-like passages 90 between the outer edges of sheet 88 and the inner edges of strips 86. An elongated inverted channel or U-shaped member 91 has its connecting portion under and secured to and in supporting relation with the insulating sheet 88 and has the free edges of its vertical side walls disposed on the upper surfaces of the upper braces 44 and 46 and the upper plates 48 and 63 previously mentioned. Each of said side walls or arms are secured integrally by welding to channels or guides 101 and 102 later further described.

Top walls or closure members for the compartments 73 and 74 are designated 92 and 93, respectively, and such members are in the form of elongated sheet metal plates which rest at their outer edges on brackets 94 secured to the inner surfaces of the side walls 28 and 29. The inner edges of the members 92 and 93 rest on the upper edges of wall portions 79 and the upper edge surface portions of the top insulating sheets 85. These inner edges of the members 92 and 93 may have lugs 95 lanced and pressed therefrom to bear against the outer upper surface portions of the walls 79 of the members 77 and 78. In this way, the closure members 92 and 93 are supported and their proper location is assured.

Figure 6:
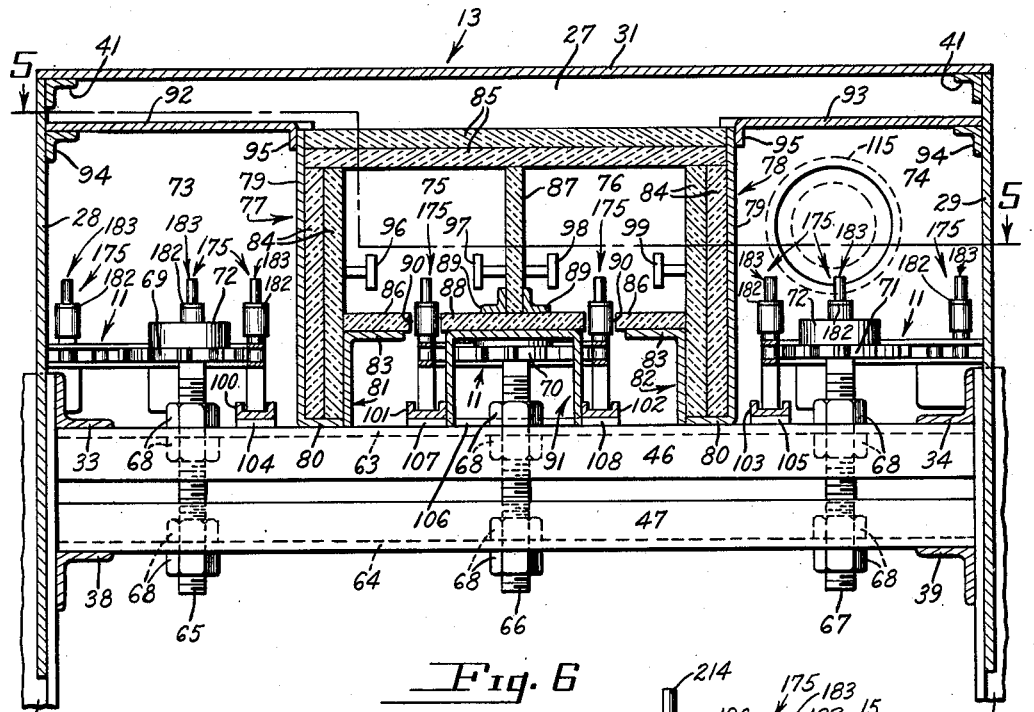
Fig. 6 is a vertical sectional view on an enlarged scale of the oven or curing portion of the machine, the view being taken as along the line 6—6 of Fig. 5.

Electric strip heaters 96, 97, 98 and 99 are supported from the opposed faces of the insulating sheets 84 and opposite sides of the sheet 87 and the strips are preferably arranged substantially opposite one another in practically horizontal alignment but in spaced relation as clearly shown in Figs. 2, 3 and 6. Thus, the strip heaters are arranged in pairs at opposite sides of the spaces above the previously mentioned slots 90.

Within the oven or curing chamber 13 and extending longitudinally thereof are four channel shaped guides and supports 100, 101, 102 and 103, respectively. Such guides are arranged parallel with one another and extend longitudinally of the oven or baking chamber and are supported on their connecting portions, which connection portions are disposed on the upper surfaces of the upper plates 48 and 63.

A short piece 104 which may be a portion of strap stock is aligned with the inner end of guide or channel 100 and extends across the plate 63 and rearwardly of the latter and at its front end aligns with and extends a short distance under the inner end of channel 100. A piece 105 similar to the piece 104 extends across the plate 63 and is aligned with the inner end of channel member 103 and associated with the sprocket 71. Disposed on a central portion of plate 63, and secured thereto, is a generally U-shaped piece or plate 106 having arms 107 and 108 aligned with the inner ends of the channel members 101 and 102.

Generally U-shaped plates 109 and 110 are associated with the sprockets 61 and 62 and plate 109 has arms 111 and 112 aligned with the forward ends of the channel members 100 and 101 while the arms 113 and 114 of the plate 110 are similarly arranged with respect to the forward ends of the channel members 102 and 103. Plates 109 and 110 may be welded at their outer edges to the frame angle iron member 35 and may have the inner ends of their arms 111, 112, 113 and 114 welded or otherwise secured to the angle iron brace 44 or to the forward ends of the channel members.

While the purpose of these guides will later be set forth in detail, it is here noted that the strap 104, channel member 100 and leg 111 of plate 109 are all aligned and located under a flight of chain leaving sprocket 69 and moving to and entering upon sprocket 61. Similarly, leg 112 of plate 109 and channel member 101 and leg 107 of plate 106 are aligned and are located under a chain flight leaving sprocket 61 and moving toward and entering upon sprocket 70. The leg 108 of plate 106, channel member 102 and leg 113 of plate 110 are aligned and constitute a path under a chain flight leaving sprocket 70 and moving toward and onto sprocket 62. In much the same manner, the leg 114 of plate 110, channel member 103, and strap 105 make a straight line path under a chain flight moving from sprocket 62 toward sprocket 71.

A blower 115 is arranged to blow air into the compartment or chamber 74 from the rear or discharge end thereof and toward the forward end of such chamber, a baffle 116 is arranged to deflect the air downwardly in the chamber. Air being forced along the chamber as described passes around the forward ends of the members defining the hot chambers 75 and 76 and may partly enter them and then enters the forward end of the pre-heating chamber 73 and is discharged through the opening 117.

It will be appreciated that the air passing along the chamber 74 will serve to cool and will extract heat from work passing rearwardly through said chamber (as will be described in detail) and also serves to keep the forward portion of the oven or curing oven 13 full of air in a manner to prevent the drawing of heated air from the chambers 75 and 76. The air being blown along by the blower 115 as described, on entering the chamber 73 is considerably heated and this heat is transferred in part from the work entering said chamber from its rear or inner end (as will be described) whereby the chamber 73 is designated a pre-heating chamber.

In addition to being trained over the sprockets 61, 62, 69, 70 and 71 (all located within the drying or curing chamber 13) the endless chain or carrier 11 is trained over sprockets 118, 119, 120 and 121 located at the inner corners of the structure 10. Of this last mentioned group of sprockets, the sprocket 119 is the driving sprocket for the chain or carrier while the other sprockets are guides or idlers. The shafts for the sprockets 118, 120 and 121 are all similarly mounted and such shafts are stationary since the sprockets themselves are but idlers or guides. It is therefore believed that a detailed description of the mounting of sprocket 121 will serve with respect to the mounting of the idlers 118 and 120 and will also avoid unnecessary description.

Thus, idler 121 rotates on the upper end portion of a threaded shaft 122 which passes through upper and lower web plates or corner plates 123 and 124 secured to the underside of the adjacent end portions of the channels or guides 18 and 21 and of lower angle iron frame members 23 and 25. Upper and lower pairs of nuts 125 and 126 are provided to be tightened against the web plates 123 and 124 to secure the shaft or post 122 in adjusted position. It will be appreciated that the various sprockets should all be in the same horizontal plane and it will be understood that in the case of any of the sprockets, with the exception of the drive sprocket 119, the clamping bolts associated with their shaft or post may be loosened and the post adjusted and thereafter the nuts tightened. For example, with respect to the sprocket 121, the nuts 125 and 126 may be loosened and the shaft or post 122 adjusted vertically (up or down as is indicated) and thereafter the nuts are again tightened against the web plates 123 and 124 to secure the shaft in its new position.

Sprocket 119 (see Fig. 11) is mounted on a shaft 127 turnable in bearings 128 and 129 mounted respectively in upper and lower web plates 130 and 131 welded, bolted or otherwise secured across the corner formed by the angle irons 17 and 19 and lower angle iron frame members 22 and 24. Mounted on the shaft 127 between the bearing members 130 and 131 is a sprocket 134 over which is trained a driving chain 132 whereby the sprocket and thus the shaft 127 with which the sprocket is fixed will be driven. The means for driving this chain 132 will later be described.

Sprocket 119 is also fixed to the shaft 127 and thus it will be clear that when the shaft is driven, said sprocket will be driven and the entire length of the endless chain or carrier 11 will be driven and will pass over all of the upper sprockets heretofore described. The sprocket 119 may be held on the shaft by a hub 133 or otherwise, as desired. Vertical adjustment of the shaft 127 is made possible whereby the sprocket 119 may be kept horizontally aligned with the other sprockets. Adjustment may be provided for in any desired manner but here a collar on the sprocket 134 is secured to the shaft as by a screw 135 and may easily be released to permit of vertical adjustment of the shaft through the collar which rests on the web 131. As an alternative, the sprocket 119 may be adjusted independent of adjustment of the shaft.

The drive from the chain 132 and thus the carrier or conveyor chain 11 has previously been generally designated 14 and the same is separate from the frame 10 and includes a heavy mounting plate 136 shown as supported by a pedestal 137. On the upper side of the plate 136 is a suitable electric motor 138 on the shaft of which is mounted a slip clutch device 139, the pulley 140 of which has trained thereover a belt 141 driving a double pulley 142 on a shaft 143 extending into a reduction gear mechanism 144. The drive shaft from such mechanism is designated 145 and the same mounts a sprocket wheel 146 over which the chain 132 is trained whereby when the motor 138 is operating and driving the reduction gearing, the chain 132 is driven and serves to impart movement to the carrier or conveyor chain 11.

Also trained over the double pulley 142 is a belt 147 additionally trained over a pulley 148 located on a shaft 149 extending into a centrifugal switch mechanism 150. Centrifugal switch mechanism 150 and the drive thereto is a safety feature designed to prevent serious injury to the chain or carrier 11 and associated mechanism. As will later appear in detail, such chain or carrier 11 is adapted to have work pieces mounted thereon and to carry such pieces through the spraying chamber 12 and the baking and curing chamber or oven 13.

In the parts 17 and 19 there are cutouts or spaces 151 through which pieces of work may fall should they casually become loose or detached from the carrier 11. However, during the normal operation of the machine, the motor 138 is operating at relatively high speed so that the pulley 140 and the slip clutch device 139 are being driven at high speed and the centrifugal switch 150 is closed. In spite of the high speed of the motor, the chain 11 is actually driven at a relatively low speed due to the presence of the reduction gear mechanism 144.

Under these circumstances, should a piece of work fall from the carrier or chain 11 and become jammed in the same or between the chain and adjacent frame portions, the increased load placed on the motor 138 will cause a loss of speed in the pulley 148 as the pulley 140 slips on the motor shaft 153 and therefore in the centrifugal switch mechanism 150. The centrifugal switch cuts out opening the circuit of the motor 138 whereby the entire chain or conveyor 11 is brought to a stop without serious damage due to wedging of the piece of work which may accidentally have fallen from such chain or conveyor.

Figures 13, 14:
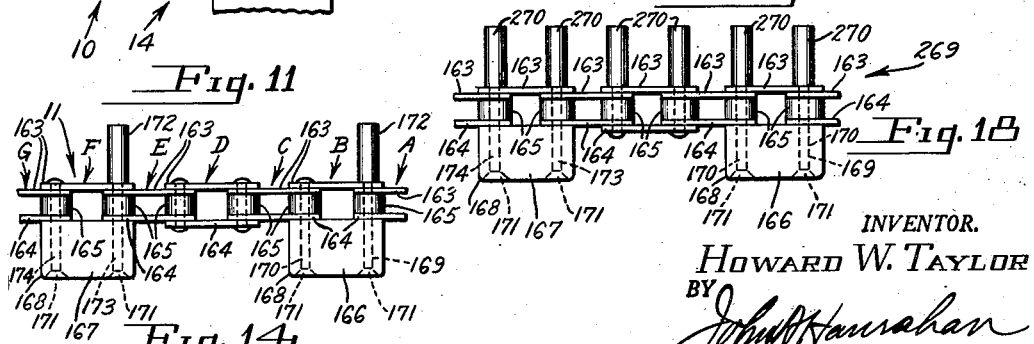
Fig. 13 is an enlarged detail sectional view through a clutch mechanism, the view being taken as along the line 13—13 of Fig. 4.
Fig. 14 is an elevational view of a section of conveyor chain, the same being shown on an enlarged scale and as looking at the chain from the opposite side to that shown in Fig. 11.

The slip clutch 139 is more fully shown in Fig. 13 and there it will be noted that the pulley 140 is mounted on bearings 152 whereby to be free to rotate about motor shaft 153. A collar 154 is fastened to the shaft as by a set screw 155 and on the pulley side of such collar, or at the pulley side of such collar, is a friction disc 156. A similar disc 157 is located at the other side of the pulley, as between the same and a clutch element 158 keyed to the shaft as at 159 but movable along the shaft. A spring 160 bears against the clutch element 158 and against a stop 161 threaded on the motor shaft and adapted to be fixed in any adjusted position on tightening of a set screw 162.

From Fig. 13, it will be clear that the spring tending to expand forces the clutch element 158 towards the pulley 140 whereby the friction disc 157 is pressed against the pulley and the latter is pressed against the friction disc 156 which in turn is forced against the fixed collar 154. With this construction, a pulley 140 is frictionally connected with the shaft 153 through the disc 156 acting on the collar 154 and the disc 157 acting through the clutch element 158, spring 160 and connector or stop 161.

Figures 11, 12:
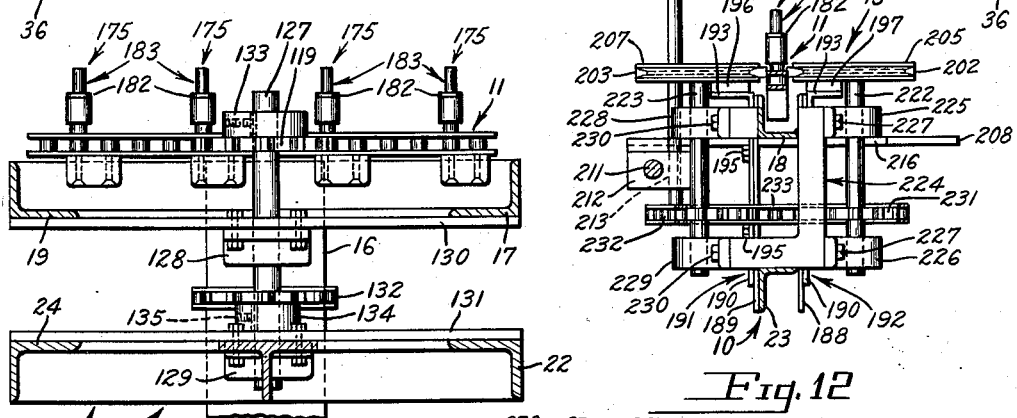
Fig. 11 is a detail sectional view on an enlarged scale of the drive, the view being taken as along the line 11—11 of Fig. 4.
Fig. 12 is a detail sectional view taken as along the line 12—12 of Fig. 7.

Chain 11 is a sprocket chain made up of links as is customary and modified for my present purpose. In Figs. 11 and 14 (showing the chain from opposite sides) a short length of chain is shown on an enlarged scale and there the shown links of the chain are separately numbered for the purpose of clarification in the description. The short length of chain as shown in Fig. 14 comprises links A, B, C, D, E, F and G.

As shown, each link includes a pair of upper and lower bars 163 and 164. The bars of every other link are overlapped at their end portions by the end portions of the next adjacent links. Thus, the end portions of the bars of link B overlie the end portions of the bars of links A and C; the end portions of the bars of link D overlie the end portions of the bars of links C and E; and the end portions of the bars of link F overlie the end portions of the bars of links E and G.

Rollers 165 are located between the corresponding end portions of the respective links and on the underside of every fifth link is a shoe. Thus, on the underside of the link B is a shoe 166 and on the underside of link F is a shoe 167. This construction is repeated for the length of the chain 11 and, in fact, depending on the work to be done, each link of the chain may be equipped with a shoe. It will be noted that each shoe has a curved or cam-like lower front corner portion 168 designed to ride up onto the guide track after the shoe has crossed over one of the breaks or openings 151 in such track or after the shoe has passed over any other break or separation between the various parts of the track. Shoe 166 is secured in place by pins 169 and 170 passing through the overlapping end portions of the bars of links A and B, and B and C, respectively, and through the rollers 165 between such end portions.

At their lower ends, these pins are headed over as at 171 and at its upper end, pin 169 is equipped with an enlarged diameter extension 172, the purpose of which will be set forth. Clearly, pins 169 and 170 serve to pivotally connect links A and B, and B and C, respectively, and to rotatably mount the rollers 165 between the end portions of such links.

Then a pair of pins 173 and 174, corresponding with the pins 169 and 170, function in connection with links E and F, and F and G, and the shoe 167, and the rollers between adjacent end portions of the named links, as described in connection with the pins 169 and 170, and the links A, B and C and the shoe 166 and the rollers between the overlapping end portions of the latter links. Where no shoes are to be mounted, shorter pivot pins or rivets of the usual construction are employed.

The pins carrying the enlarged diameter extensions 172 (that is, the pins 169, 173, etc.) are adapted for the carrying of the work. Work is not mounted directly on these pins or their extensions but is mounted on work carrying spindles 175 (see Fig. 15) each comprising an elongated transversely circular body comprising an intermediate portion 176 of very large diameter, an upper reduced diameter end portion 177 and a lower end portion 178 of less diameter than the intermediate portion 176 and of greater diameter than the upper end portion 177. At the juncture of portions 176 and 177, an upper shoulder 179 is provided and at the juncture of the portions 176 and 178 a lower shoulder 180 is provided.

Entering the body through the lower reduced diameter end portion 178 thereof and extending into the intermediate section 176 thereof is a socket or recess 181 of a diameter and of a depth to receive any pin extension 172. One of these work spindles 175 is disposed on each pin extension 172 and the fit is as suggested in Figs. 9 and 10. The work carrying spindles will be moved along with the chain 11 owing to the mounting of the spindles on the pin extensions 172 and the said spindles are adapted for turning or rotary movement on the pin extensions as axes. The purpose of this arrangement will later be set forth.

At times all of the work spindles 175 of a chain may not be used. Thus, for larger sizes of work pieces, it may be that only every other spindle would be used so that the work will be properly spaced along the chain. In such instances, a washer 182 may be disposed over the spindle part 177 to lie on the shoulder 179 and then a small sheet metal cap 183 (see Figs. 16 and 17) may be slipped over the upper part or the spindle portion 177 whereby such spindle portion and the shoulder 179 are masked and will not become coated with paint or other coating material being used. Where the work will cover the described portions of the spindle, or as to those spindles on which work is mounted, masking of the spindle as described is not necessary.

The masking means is shown on the spindle in Fig. 10 wherein a piece of work is suggested in dotted lines at 184, although it will be understood from this figure that in the shown instance the masking means comprising the washer 182 and cap 183 may be omitted and yet the spindle portions would be covered by the work. However, masking devices may be used if the work will fit over them, as suggested in the dotted line illustration at 184 in Fig. 10.

Preferably, the masking cap 183 is simply formed from a piece of sheet metal and it may be drawn, if desired, as from brass, or the like. To give it some rigidity and to have it in part closely embrace the spindle portion 177, the device may be drawn-in or have its diameter reduced in its lower portion and provided with the ribs 185. It will be understood that the device is open at its lower end or one end, as at 186, and is closed at its upper end as at 187.

As the chain 11 moves between the sprockets 118, 119, 120 and 121 of the structure 10, its shoes 166, 167 and its similar shoes throughout its length move over the upper frame angle iron pieces 17, 19, 18, etc. These shoes may drag on the horizontal portions of such angle iron pieces and this is especially true when the chain is carrying much work, as at such times the chain may tend to excessively sag in its portions between the sprockets. When the chain enters the oven 13, its shoes may and preferably do ride on the strap 104, channel 100, plate 109 and especially the arms 111 and 112 of the latter as the chain approaches and leaves the sprocket 61. Also, the chain shoes ride on the channel members 101, 102 and 103 and the plates, including the arms or legs of such plates 106, 110 and strap 105. In this way, the work laden chain while in the oven is carefully supported in its portions between the sprockets.

The angle iron members 18 and 23 are in parallel relation and secured against and to the opposite sides of such members are vertical L-plates 188 and 189. On the respective outer sides of such plates there are mounted the vertical portions 190 of pairs of brackets 191 and 192, each at its upper end including a right-angularly disposed shelf-like portion 193. In its vertical portion 190, each bracket is slotted vertically as at 194 and bolts 195 passing through said slots are threaded into one of the plates 188 and 189. Clearly, on loosening of these bolts, the brackets 191 and 192 may be adjusted vertically relative to the plates and after any desired adjustment is made, the bolts are tightened. Fastened to the upper sides of the shelf-like portions 193 of brackets 191 is a bar or plate 196 and a similar plate or bar 197 is similarly fastened to the upper surfaces of the shelf-like portions 193 of the brackets 192.

Bar 197 serves to support a series of spindles mounting a series of idler pulleys 198 while bar 196 serves to mount a series of spindles serving to mount a series of idler pulleys 199. From Fig. 7 it will be noted that the pulleys of one series are arranged in alternate relation with those of the other series. Also, as shown in that figure, the bars 196 and 197 have transverse slots 200 in their end portions and bolts 201 passing through said slots secure the bars to the respective shelf-like portions 193. However, on loosening of the bolts 201, it will be clear that the bars and the pulleys mounted thereon may be adjusted horizontally toward and from one another.

The idlers 198 and 199 are driven by and form supports and guides for the inner or adjacent flights of a pair of belts 202 and 203 trained over pairs of pulleys 204 and 205, and 206 and 207, respectively. A pair of members 208 and 209 are arranged in parallel relation and are fixed, as by riveting, welding, or the like, to the horizontal web of the angle iron frame member 18 and extending inwardly of the machine frame have their inner ends anchored to an intermediate angle iron brace member 210.

Beyond the rear wall of machine structure 10, the outer ends of the members 208 and 209 are connected by a round bar 211 having its ends anchored in vertical flange portions of the members. The bar 211 supports one or more blocks 212 which are mounted on the bar but having the latter pass through them, and each of which has an opening 213 therethrough for the mounting of a vertical rod 214 designed to support a paint spray device 215 (Fig. 1). The blocks are slotted through their inner ends to the openings 213 whereby when a rod 214 is vertically adjusted to the desired position, the slotted end of the block is clamped to draw its slotted portion closed and have the block bite or clamp against the rod 214 whereby to maintain it in the desired position.

The pulleys 204 and 206 are mounted on a plate or web 216 comprising an extension of the brace 208 or a plate welded or otherwise secured to said brace. Specifically, (Fig. 9) these pulleys are mounted on similar threaded bars or shafts 217 and 218, the lower portion of each of which passes through the plate 216 and is provided with clamping nuts 219 threaded on the shaft and designed to be tightened against the respective sides of the plate to hold the respective shafts, and thus the pulleys 204 and 206, in the desired positions of vertical adjustment. Clearly, on loosening of the nuts 219, the mounting posts or shafts 217 and 218 may be vertically adjusted whereby to have the pulleys 204 and 206 in horizontal alignment in the desired planes and thereafter the nuts are again tightened against the plates 216. Here it is noted that the pulleys 204 and 206 are V-pulleys and that the belts 202 and 203 are V-belts, and that the idlers 198 and 199 are also V-type pulleys. Also, it will be noted that the shafts 217 and 218 pass through elongated slots 220 and 221 (Fig. 7) in the plate 216 whereby when the nuts 219 are loosened, said shafts may be adjusted toward or from the pulleys 205 and 207. Actually, the adjustment will generally be from the latter named pulleys and for the purpose of taking up slack in the belts 202 and 203.

Pulleys 205 and 207 are mounted on shafts 222 and 223 (Fig. 12) respectively. A bracket 224 is welded or otherwise secured to the frame members 18 and 23. Bearing members 225 and 226 are secured to the outer sides of such member as by bolts 227. Other bearing members 228 and 229 are mounted on bracket 224 and frame member 18 in vertical alignment and are secured in place as by bolts 230. The bearing members 225 and 226 form a mounting for the shaft 222 while the bearing members 228 and 229 accomplish the same purpose for the shaft 223. In addition to the pulleys 205 and 207, the shafts 222 and 223 mount sprocket wheels 231 and 232 over which are trained a chain 233 also trained over a sprocket 234 (Fig. 7) on the drive shaft 235 of a gear reduction unit 236.

Suspended from the angle iron frame member 23 and a brace (not shown) located below the brace 210 are a pair of parallel straps or strap-like members 237 and 238 between them mounting a plate 239 on the upper side of which is mounted the reduction gearing unit 236. Also, on said plate is a cradle device (Fig. 4) including parallel mounting and guide rods 240 and an electric motor 241. Motor 241 includes a base portion 242 mounted on the rods 240 for movement therealong. A long screw 243 is threaded to the base 242 and passes out to the rear of the machine where it is equipped with a hand wheel 244. On turning of this hand wheel, the base 242 and the motor 241 thereon may be adjusted along the guide rods 240.

The shaft of motor 241 carries a pulley 245 which through a belt 246 drives a pulley 247 on the shaft 248 of the reduction gear device 236.

With this arrangement, when the motor 241 is energized it drives the belt 246 which in turn drives the shaft 248 of the reduction gearing device 236 whereby the output or drive shaft of such device is driven at reduced speed and through the sprocket 234 drives the chain 233 and thus the sprockets 231 and 232 of the shafts 222 and 223. Clearly, when such shafts are driven, the pulleys 205 and 207 thereon are driven whereby the belts 202 and 203 are set in motion. These belts, in their inner flights passing over the sets of idlers 198 and 199, are held in certain predetermined relation.

As shown in Fig. 8, the pulleys 204, 205, 206 and 207 are all in the same, or substantially the same, horizontal plane. However, the idlers 198 and 199 are in a plane slightly higher than that in which the pulleys 204–207 are located. Thus, the inner flights of the belts 202 and 203 incline upwardly as they approach the sets of idlers and then incline downwardly as they leave the sets of idlers.

When using the machine, a frame 249 (Fig. 1) may be hooked over a railing 250 extending about the structure 10, and a similar frame 251 is hooked over the railing at a different point. These frames 249 and 251 are designed to receive tote boxes. A tote box of pieces to be treated will be suspended in frame 251 and the operator will place the pieces on the work spindles 175. Work spindles not to be used will be masked. The chain or conveyor 11 being moved, the work will be carried into the spray chamber 12 as through an entrance 252 to such chamber and then out through the exit 253 from the chamber and thereafter into the oven or curing chamber 13 through the entrance 254. The work will pass back and forth through the compartments 73, 75, 76 and 74, of the oven or curing chamber and then out through an exit 255. At the station 249, the finished work may be taken from the conveyor and deposited in a tote box for later removal.

For the greater part of the length of the chain, or for the greater part of the path along which the chain carries the work, the work remains stationary except for its movement with the chain. However, in the spray chamber or compartment 12, the work must be rotated so as to present all its outer surfaces to the spray of paint or other coating material from the spray devices 215. Clearly, while two rods 214 have been shown, each adapted to mount one of the spray devices 215, it will be clear that a greater or lesser number of rods may be provided so that the desired number of spray devices may be located in the chamber 12.

As the chain 11 moves into the chamber 12 it carries the work spindles 175 between the inner flights or adjacent flights of the belts 202 and 203. Thus, as the chain advances from the sprocket 120 toward sprocket 121, on first entering the chamber 12, the work is advanced as from between the pulleys 204 and 206 toward the pulleys 205 and 207. It will be recalled that such portions of the inner flights of the belts 202 and 203 are inclined upwardly toward the plane of the pulleys or idlers of the sets or series 198 and 199. This is as shown best in Fig. 8.

At this time, the mentioned inner flights of the belts 202 and 203 are under the shoulders 180 of the work spindles 175 but do not interfere with the progress of the chain 11. As the chain continues to advance, the upwardly inclining portions of the belts come against the shoulders 180 of the work spindles and raise such spindles vertically. Thus, the spindles may be raised from the relationship of Fig. 9 to that of Fig. 10. Now the belts supporting the spindles and bearing against the shoulders 180 of the latter, the spindles are rotated since the belts are being driven by the motor 241. These belts are not driven at high speeds because of the reduction gearing 236 interposed between the motor and the belts and the relative diameters of the small driving sprocket 234 and the large driving sprockets 231 and 232. However, the belts are engaging small diameter portions of the work spindles so that the latter are rotated fairly rapidly.

At this time the sprayers 215 are in operation spraying paint or other coating material onto the work carried by the spindles and since the work is being rotated, all portions of the work will be equally exposed to the spray of coating material. As the chain 11 progresses along through the chamber 12 toward the sprocket 121, the work spindles are permitted to descend along the enlarged diameter portions 172 of the particular pins or of the pins carrying or equipped with work spindles so the work spindles resume their normal positions with respect to the chain 11. They are gradually let down by the decline of the inner flights of the belts 202 and 203 as such flights approach the pulleys 205 and 207 so that the spindles return to a normal relation with the belt, as suggested in Fig. 9.

Thereafter, the spindles and their freshly coated work pass out of the spray compartment 12 and enter the oven or curing chamber 13. In such oven, the work is initially introduced into the pre-heating compartment 73 and then the work is carried into the compartment 75 where it is directly between the heating elements 96 and 97 since the chain spindles support the work by passing upwardly through the gap or slot 90 between the insulating portions 86 and 88.

At this time, the work is exposed to a high degree of heat within the chamber 75 and additionally to radiant heat from the elements 96 and 97. Work passes rearwardly with the chain through the compartment 75 and around the sprocket 70 and then into the chamber or compartment 76 where it is also subject to intense heat. In addition to the atmospheric heat within the compartment or chamber 76, the work is also directly exposed to radiant heat from the heater elements 98 and 99. From the compartment 76, the chain carries the work out around the sprocket 62 and into the cooling compartment or chamber 74 from whence the work passes to the exit 255.

As explained above, the blower 115 is blowing cool air into the chamber 74 and this air serves to cool the work so that when it reaches the station 249, it may be handled and the cooling helps to set the coating material. Further, the air entering and moving through compartment or chamber 74 serves to prevent flow of air from the hot compartments 75 and 76. In addition, air being moved forwardly by the blower 115 becomes somewhat heated as it extracts the heat from the work and the portions of chain 11 in said compartment. This air moving about the forward ends of compartments 75 and 76 maintains the forward portion of the oven full of air and retards movement of the intensely heated air from the compartments 75 and 76.

The blown air moving across the forward end of the oven enters the pre-heating chamber or compartment 73 and moves rearwardly therein and exhausts through the upper opening 117. Chamber or compartment 73 is described as a pre-heating chamber or compartment since the described rearwardly moving air is somewhat heated and envelopes and passes over the incoming forwardly moving work in the compartment. Some heat is extracted from the air by the newly introduced work so there is a saving in heat and as the work enters chamber or compartment 75, it is already fairly heated.

The cover or closure 31 on the upper side of the baking or curing oven 13, where the sprayed coating on the work is baked or otherwise cured, includes a hollow vertical extension 256 having an exhaust conduit 257 leading therefrom. The blower or exhaust mechanism 32 includes a fan 258 driven as by a motor 259 through a belt 260. Thus, fumes and gases from the oven 13 may be kept out of a factory or the like in which the present machine is being used and may be exhausted to the atmosphere through conduit 257. In connection with this exhaust mechanism, it will be understood that baffle 116 prevents too free a movement of air from the top of compartment 74 and that the inner cover plates 92 and 93 of compartments 73 and 74 and the top insulating sheets 85 of compartments 75 and 76 further this purpose.

An extension 261 from the upper end of the spraying or coating compartment 12 has an exhaust conduit 262 connected therewith for the carrying of paint or lacquer fumes from about the machine and as to the outside of a building. In the hollow extension 261 is an exhaust fan 263 driven as by a motor 264 through a belt 265. The motors 259 and 264 are shown as having their bases or platforms 266 and 267, respectively, pivoted on brackets 268 on the outer sides of the hollow bodies 256 and 261. Thus, adjustments and repairs may be easily made.

In Fig. 18 I have shown a short section 269 of a slightly modified chain construction. Since the modification is but slight and the parts are the same as previously described, the same reference characters have been used where possible. Hereinbefore, it was suggested when particularly considering Fig. 14, that every fifth connecting pin of the chain be provided with an enlarged extension 172 and that the chain might include more such extensions, if desired. Fig. 18 illustrates this suggested modification and in that figure it is noted that each pivot or connecting pin of the chain is provided with an enlarged extension 270. These extensions are to receive work spindles 175 or masking devices, as in the case of the extensions 172. It will be appreciated that each pin having an extension 270 (Fig. 18) the chain is adapted to carry a great many small work pieces and that the chain may be used for larger work pieces simply by masking some of the pin extensions and not using them.

Having thus set forth the nature of my invention, what I claim is:

1. In a machine of the character described, a frame structure, sprockets on said structure, an endless chain trained over said sprockets, means for moving said chain along said sprockets, upstanding pin-like portions at spaced points along the length of said chain, work spindles on said portions and movable therewith and adapted to be raised thereon and to rotate relative thereto, means mounting a pair of belts one at each side of a portion of said chain, means for driving said belts, and said belts arranged to have their adjacent flights engage opposite sides of said work spindles and elevate and rotate the latter and the work carried by them as the spindles and work move along with the chain.

2. In a machine of the character described, a frame structure, an endless chain supported on said structure for movement relative thereto, upstanding pin-like extensions at spaced points along the length of said chain, work spindles on said extensions and movable therewith and adapted to be raised thereon and rotated relative thereto, a pair of pulleys at each side of a portion of said chain and spaced longitudinally of said chain portion, sets of idlers at each side of said chain portion and located between and in an elevation slightly above the pulleys of the respective pairs, an endless belt trained over each pair of pulleys, said belts having their adjacent flights trained over the respective sets of idlers whereby the adjacent flights of the belts at the respective sides of the chain portion incline upwardly to said idlers and then incline downwardly, said adjacent flights of the belts arranged to engage said work spindles as the chain moves between said belts to elevate said spindles on said pin-like extensions and rotate the spindles and the work mounted thereon and to again lower the spindles fully onto the pin-like extensions, and means for driving one pulley of each of said pair.

3. In a machine of the character described, a frame structure, an endless chain supported on said structure for movement relative thereto, upstanding pin-like extensions at spaced points along the length of said chain, work spindles on said extensions and movable therewith and adapted to be raised thereon and rotated relative thereto, a pair of pulleys at each side of a portion of said chain and spaced longitudinally of said chain portion, sets of idlers at each side of said chain portion and located between and in an elevation slightly above the pulleys of the respective pairs, an endless belt trained over each pair of pulleys, said belts having their adjacent flights trained over the respective sets of idlers whereby the adjacent flights of the belts at the respective sides of said chain portion incline upwardly to said idlers, extend horizontally along the same and then incline downwardly, said adjacent flights of the belts being arranged to engage said work spindles as the chain moves between said belts to elevate said spindles on said pin-like extensions and rotate the spindles and the work mounted thereon and to again lower the spindles fully onto the pin-like extensions, means for driving one pulley of each of said pair, said means comprising sprockets on the shafts of said pulleys, an endless chain trained over said sprockets, means for driving said chain, said chain driving means comprising a gear reduction means, an electric motor, a belt drive between the motor and said gear reduction means, and means for adjusting the motor toward and from said gear reduction means.

4. In a machine of the character described, a frame structure, an endless chain supported on said structure for movement relative thereto, spaced pin-like extensions on said chain, work spindles on said extensions and movable therewith and adapted to be raised thereon and rotated relative thereto, a pair of pulleys at each side of a portion of said chain and spaced longitudinally of said chain portion, sets of idlers at each side of said chain portion and located between and in an elevation slightly above the pulleys of the respective pairs, an endless belt trained over each pair of pulleys, said belts having their adjacent flights trained over the respective sets of idlers whereby the adjacent flights of the belts at the respective sides of the chain portion between said belts incline upwardly to said idlers and horizontally along the same and then incline downwardly, said adjacent flights of the belts arranged to engage said work spindles as the chain moves between said belts and to elevate said spindles on said pin-like extensions and rotate the spindles and the work mounted thereon while moving with said chain between said belts and to again lower the spindles fully onto the pin-like extensions, means for driving one pulley of each of said pair, and means mounting each of said sets of idlers for adjustment toward and from the other thereof and the adjacent portion of said chain.

5. In a machine of the character described, a horizontal frame structure, vertical shafts on said structure, horizontal sprockets on said shafts, an endless chain trained over said sprockets, means for driving said chain along said sprockets, vertically extending pin-like portions at spaced points along the length of said chain and rigid therewith, work spindles on said pin-like portions and movable therewith and adapted to be raised thereon and to rotate relative thereto, means for mounting in horizontal positions a pair of belts one at each side of a portion of said chain, means for driving said belts, and said belts positioned to have their adjacent flights engage opposite sides of said work spindles and elevate and rotate the work spindles as said portion of said chain moves along between said belts.

6. In a machine of the character described, a horizontal frame structure, vertical shafts on said structure, horizontal sprockets on said shafts, an endless chain trained over said sprockets, means for driving said chain along said sprockets, vertically extending pin-like portions at spaced points along the length of said chain and rigid therewith, work spindles on said pin-like portions and movable therewith and adapted to be raised thereon and to rotate relative thereto, means for mounting in horizontal positions a pair of belts one at each side of a portion of said chain, means for driving said belts, said belts positioned to have their adjacent flights engage opposite sides of said work spindles and elevate and rotate the work spindles as said portion of said chain moves along between said belts, and means to stop the driving of said chain along said sprockets on an overload on the chain.

7. In a machine of the character described, a horizontal frame structure, vertical shafts on said structure, horizontal sprockets on said shafts, an endless chain trained over said sprockets, means for driving said chain along said sprockets, vertically extending pin-like portions at spaced points along the length of said chain and rigid therewith, work spindles on said pin-like portions and movable therewith and adapted to be raised thereon and to rotate relative thereto, pairs of pulleys mounting in horizontal positions a pair of belts one at each side of a portion of said chain, said belts positioned to have their adjacent flights engage opposite sides of said work spindles and elevate and rotate the work spindles as said portion of said chain moves along between said belts, means for driving one pulley of each of said pair, said means comprising sprockets on the shafts of said pulleys, an endless chain trained over said sprockets, means for driving said chain, said chain driving means comprising a gear reduction means, an electric motor, a belt drive between the motor and said gear reduction means, and means for adjusting the motor toward and from said gear reduction means.

8. In a machine of the character described, a horizontal frame structure, horizontal sprockets supported from said frame structure, an endless chain supported on said sprockets for movement relative to said frame structure, means for driving one of said sprockets and thereby said chain, upstanding pin-like extensions at spaced points along the length of said chain, work spindles on said extensions and movable therewith and adapted to be raised thereon and rotated relative thereto, a pair of pulleys at each side of a portion of said chain and spaced longitudinally of said chain portion, sets of idlers at each side of said chain portion and located between and in an elevation slightly above that of the pulleys of the respective pairs, an endless belt trained over each pair of pulleys, said belts having their adjacent flights trained over the respective sets of idlers whereby the adjacent flights of the belts at the respective sides of the chain portion incline upwardly to and then along said idlers and then incline downwardly, said adjacent flights of the belts being arranged to engage work spindles as the chain moves between said belts to elevate said spindles on the pin-like extensions and rotate the spindles and to again lower the spindles fully onto the pin-like extensions, means for driving one pulley of each of said pair, means for independently adjusting said pulleys vertically, and other means for vertically and simultaneously adjusting all of the idlers of a set.

HOWARD W. TAYLOR.

REFERENCES CITED

The following references are of record in the file of this patent:

UNITED STATES PATENTS

| Number | Name | Date |
|---|---|---|
| 296,506 | Baldwin | Apr. 8, 1884 |
| 991,433 | Edison | May 2, 1911 |
| 1,333,006 | Welser | Mar. 9, 1920 |
| 1,334,840 | Collins | Mar. 23, 1920 |
| 1,750,313 | Emmert | Mar. 11, 1930 |
| 1,775,003 | Soelch | Sept. 2, 1930 |
| 1,928,938 | Johnson | Oct. 3, 1933 |
| 2,026,080 | Ziska | Dec. 31, 1935 |
| 2,060,131 | Sosa | Nov. 10, 1936 |
| 2,210,187 | Ross | Aug. 6, 1940 |
| 2,271,442 | Sanborn | Jan. 27, 1942 |
| 2,354,124 | James | July 18, 1944 |
| 2,371,926 | Schmitt | Mar. 20, 1945 |
| 2,372,646 | Barnby | Apr. 3, 1945 |
| 2,379,960 | Harris | July 10, 1945 |
| 2,383,023 | Sykes et al. | Aug. 21, 1945 |
| 2,472,914 | Mercier | June 14, 1949 |
| 2,479,822 | Enkur | Aug. 23, 1949 |
| 2,514,104 | Sutherland | July 4, 1950 |